(12) United States Patent
Lai

(10) Patent No.: US 8,246,259 B2
(45) Date of Patent: Aug. 21, 2012

(54) CAMERA MODULE WITH ANTI-ASTIGMATIC LENS

(75) Inventor: Cheng-Yi Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/869,761

(22) Filed: Aug. 27, 2010

(65) Prior Publication Data

US 2011/0150460 A1  Jun. 23, 2011

(30) Foreign Application Priority Data

Dec. 18, 2009  (TW) ................................ 98143554 A

(51) Int. Cl.
    *G03B 17/00* (2006.01)
(52) U.S. Cl. ........................................ 396/529; 359/819
(58) Field of Classification Search .................. 396/529; 359/819
    See application file for complete search history.

(56) References Cited

U.S. PATENT DOCUMENTS

| 3,897,133 | A | * | 7/1975 | Warner et al. | 359/365 |
| 4,488,776 | A | * | 12/1984 | Skinner | 359/808 |
| 2003/0193605 | A1 | * | 10/2003 | Yamaguchi | 348/335 |
| 2004/0125470 | A1 | * | 7/2004 | Chiang | 359/796 |
| 2009/0047011 | A1 | * | 2/2009 | Okamoto et al. | 396/529 |
| 2009/0147381 | A1 | * | 6/2009 | Chen | 359/819 |
| 2010/0053772 | A1 | * | 3/2010 | Oh et al. | 359/736 |

\* cited by examiner

*Primary Examiner* — Christopher Mahoney
*Assistant Examiner* — Fang-Chi Chang
(74) *Attorney, Agent, or Firm* — Altis Law Group, Inc.

(57) ABSTRACT

An exemplary camera module includes a lens barrel defining an aperture for light entering the lens barrel and a lens received in the lens barrel. The lens includes a central optical portion aligned with the aperture of the lens barrel and a fixing portion around a periphery of the optical portion for fixing the lens in the lens barrel. An outside surface of the fixing portion of the lens is beveled relative to an optical axis of the camera module.

16 Claims, 4 Drawing Sheets

CAMERA MODULE WITH ANTI-ASTIGMATIC LENS

BACKGROUND

1. Technical Field

The present disclosure relates to image capture devices, and more particularly to a camera module for a portable electronic device.

2. Description of Related Art

Camera modules are common accessories in mobile telephones, personal digital assistants and other similar devices, allowing for convenient and practical image capturing. Referring to FIG. 4, a commonly used camera module includes lenses 90 received in a lens barrel 80. The lens barrel 80 defines an aperture 84 at one end thereof for light from an object to enter therein.

Each of the lenses 90 includes an optical portion 92 aligned with the aperture 84, and a fixing portion 94 around the optical portion 92. The lenses 90 are affixed to the lens barrel 80 by the fixing portions 94. During operation, as schematically indicated by path V, the light from the object passes through the lenses 90 toward an image sensor. However, an outside profile of the fixing portion 94 of each lens 90 is generally cylindrical, and thus total internal reflection is easily generated at an outer periphery of the fixing portion 94. Therefore, astigmatic light is formed at the periphery of the fixing portions 94 of the lenses 90, reducing the quality of the captured image.

It is thus desirable to provide a camera module which can overcome the described limitations.

DETAILED DESCRIPTION

Figure 1:
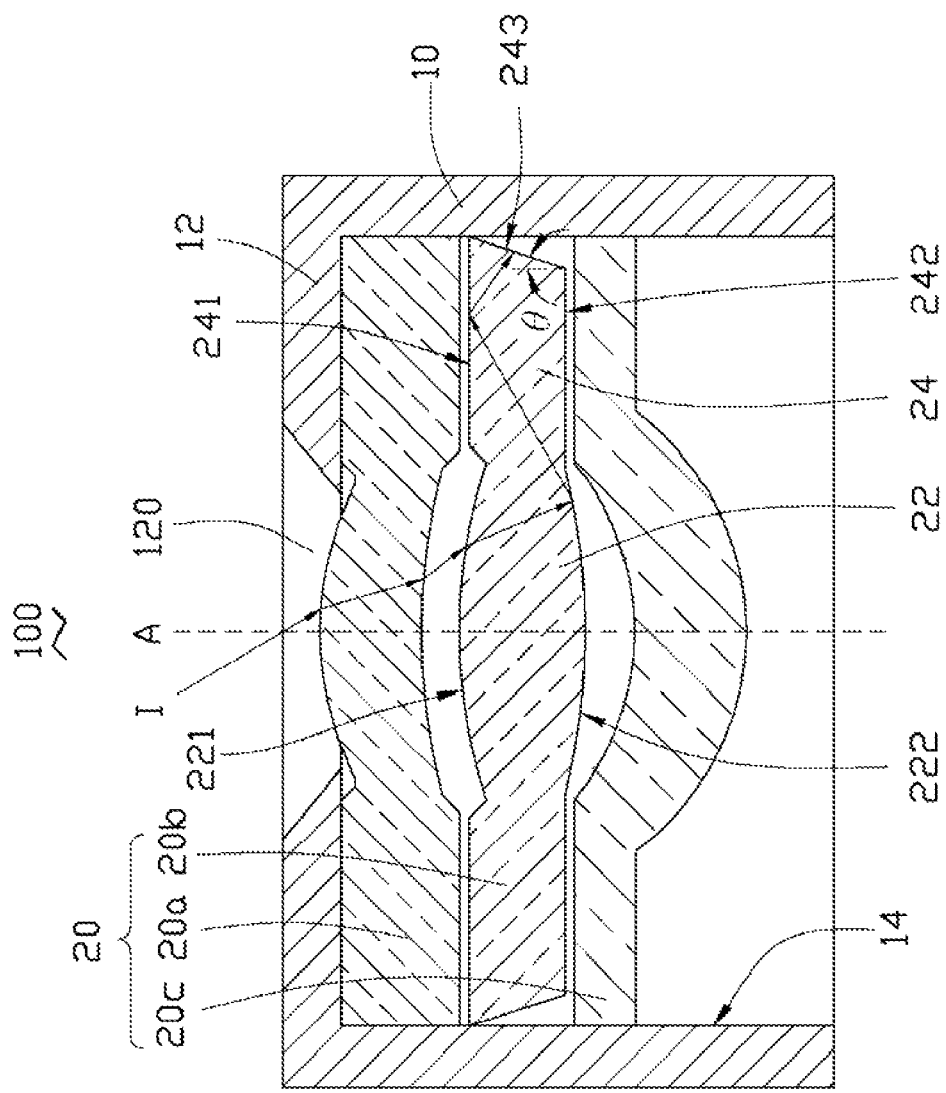
FIG. 1 is a schematic, cross-sectional view of a camera module according to a first embodiment of the present disclosure.

Referring to FIG. 1, a camera module 100 according to a first embodiment is shown. The camera module 100 includes a lens barrel 10, a lens unit 20, and an image sensor (not shown).

The lens barrel 10 is essentially a hollow cylindrical body encompassing the lens unit 20 therein. In this embodiment, a top end of the lens barrel 10 is at an object side of the lens unit 20, and a bottom end of the lens barrel 10 is at an image side of the lens unit 20. An annular flange 12 extends inwardly from the top end of the lens barrel 10. The flange 12 defines a central aperture 120, which admits light from an object into the lens barrel 10. A central axis of the aperture 120 is collinear with that of the lens barrel 10. The image sensor is arranged at the image side of the lens unit 20, and is for converting the light from the object into an image.

In this embodiment, the lens unit 20 includes a first lens 20a, a second lens 20b and a third lens 20c. The first, second and third lenses 20a, 20b, 20c are received in the lens barrel 10, and aligned in that order along an optical axis A of the camera module 100 from the object side to the image side. The optical axis A of the camera module 100 is coaxial with the central axis of the lens barrel 10. The first lens 20a, the second lens 20b and the third lens 20c are made of glass or plastic material.

Each of the first, second and third lenses 20a, 20b, 20c includes a circular optical portion 22 located at a center thereof, and a fixing portion 24 located around a periphery of the optical portion 22. The optical portion 22 of each of the lenses 20a, 20b, 20c includes an incident surface 221 oriented towards the object side, and an emitting surface 222 oriented towards the image side. The incident surface 221 and the emitting surface 222 of the optical portion 22 of the lenses 20a, 20b, 20c can be convex or concave, and the selected configuration changes the characteristics of the light passing through the lenses 20a, 20b, 20c. For example, the incident surface 221 and the emitting surface 222 can be spherical or aspherical.

The optical portion 22 of the first lens 20a is configured for refracting the light from the object to the optical portion 22 of the second lens 20b. In this embodiment, the optical portion 22 of the first lens 20a is a meniscus, and includes a convex incident surface 221 facing the aperture 120 of the flange 12 and a concave emitting surface 222 facing the second lens 20b.

The optical portion 22 of the second lens 20b is configured for receiving the light from the first lens 20a, and refracting the light to the optical portion 22 of the third lens 20c. In this embodiment, the optical portion 22 of the second lens 20b is a biconvex lens aligned with the optical portion 22 of the first lens 20a, and includes a convex incident surface 221 facing the first lens 20a and a convex emitting surface 222 facing the third lens 20c.

The optical portion 22 of the third lens 20c is a meniscus, and includes a concave incident surface 221 facing the second lens 20b and a convex emitting surface 222 facing the image sensor. The optical portion 22 of the third lens 20c is configured for receiving the light from the second lens 20b, and refracting the light to the image sensor. Thereby, the image of the object can be captured by the image sensor.

The fixing portions 24 of the first, second and third lenses 20a, 20b, 20c are configured for securing the first, second and third lenses 20a, 20b, 20c in the lens barrel 10. The fixing portion 24 of each of the first, second and third lenses 20a, 20b, 20c includes an annular object-side surface 241, an annular image-side surface 242, and a lateral-side surface 243. In each lens 20a, 20b, 20c, the object-side surface 241 extends radially outwardly from a periphery of the incident surface 221 of the optical portion 22, the image-side surface 242 extends radially outwardly from a periphery of the emitting surface 222 of the optical portion 22, and the lateral-side surface 243 interconnects outer peripheries of the object-side surface 241 and the image-side surface 242.

In this embodiment, the object-side surfaces 241 and the image-side surfaces 242 of the fixing portions 24 of the first, second and third lenses 20a, 20b, 20c are all planar, and are all substantially perpendicular to the optical axis A of the camera module 100. The lateral-side surfaces 243 of the fixing portions 24 of the first and third lenses 20a, 20c are cylindrical (or annular), and are substantially parallel to the optical axis A of the camera module 100. A diameter of each of the lateral-side surfaces 243 of the fixing portions 24 of the first and third lenses 20a, 20c is substantially equal to an inner diameter of the lens barrel 10.

The lateral-side surface 243 of the fixing portion 24 of the second lens 20b has a frustoconical shape, i.e., a shape of a circular truncated cone. A diameter of the lateral-side surface 243 of the fixing portion 24 of the second lens 20b gradually decreases from the object-side surface 241 to the image-side surface 242 of the second lens 20b. Preferably, the lateral-side surface 243 of the second lens 20b at the object-side surface 241 has the maximum diameter, being approximately equal to the inner diameter of the lens barrel 10; while the lateral-side surface 243 of the second lens 20b at the image-side surface 242 has the minimum diameter, being less than the inner diameter of the lens barrel 10. An angle θ is defined between the optical axis A of the camera module 100 and the lateral-side surface 243 of the fixing portion 24 of the second lens 20b. The angle θ ranges from about 1° to about 89°.

During image capture by the camera module 100, light from the object enters the lens barrel 10 via the aperture 120 of the flange 12, passes through the first lens 20a, the second lens 20b and the third lens 20c, and finally reaches the image sensor. The image sensor converts the light of the object introduced through the lenses 20a, 20b, 20c into digital data to generate an image. When the light passes through the second lens 20b, most of the incident light on the emitting surface 222 of the optical portion 22 of the second lens 20b directly exits the second lens 20b therefrom. Simultaneously, a portion of the incident light on the emitting surface 222 of the optical portion 22 of the second lens 20b is reflected by the emitting surface 222 towards the object-side surface 241 of the fixing portion 24 of the second lens 20b.

As indicated by path I in FIG. 1, the illustrated portion of the incident light reflected to the fixing portion 24 of the second lens 20b is reflected by the object-side surface 241 towards the lateral-side surface 243 directly. However, other similar portions of the light may be reflected repeatedly at the object-side surface 241 and the image-side surface 242 in the fixing portion 24 before propagating to the lateral-side surface 243. Since the lateral-side surface 243 is beveled (slanted), the illustrated portion of the light reflected towards the lateral-side surface 243 has a reduced incident angle. The total internal reflection at the lateral-side surface 243 is therefore greatly reduced or even avoided altogether. Thus the light incident on the lateral-side surface 243 can exit to an exterior of the second lens 20b through the lateral-side surface 243. Accordingly, astigmatic light associated with the peripheral portion of the second lens 20b is avoided, and the image quality of the camera module 100 can be improved. Furthermore, preferably, the inner surface 14 of the lens barrel 10 is black and can absorb, rather than reflect, the light incident thereon.

The lens unit 20 disclosed in the first embodiment has three lenses 20a, 20b, 20c, and the beveled surface is only formed at the lateral-side surface 243 of the fixing portion 24 of the second lens 20b. However, the beveled surface can be further or alternatively formed at other parts of the fixing portions 24 among any of the three lenses 20a, 20b, 20c of the lens unit 20.

Figure 2:
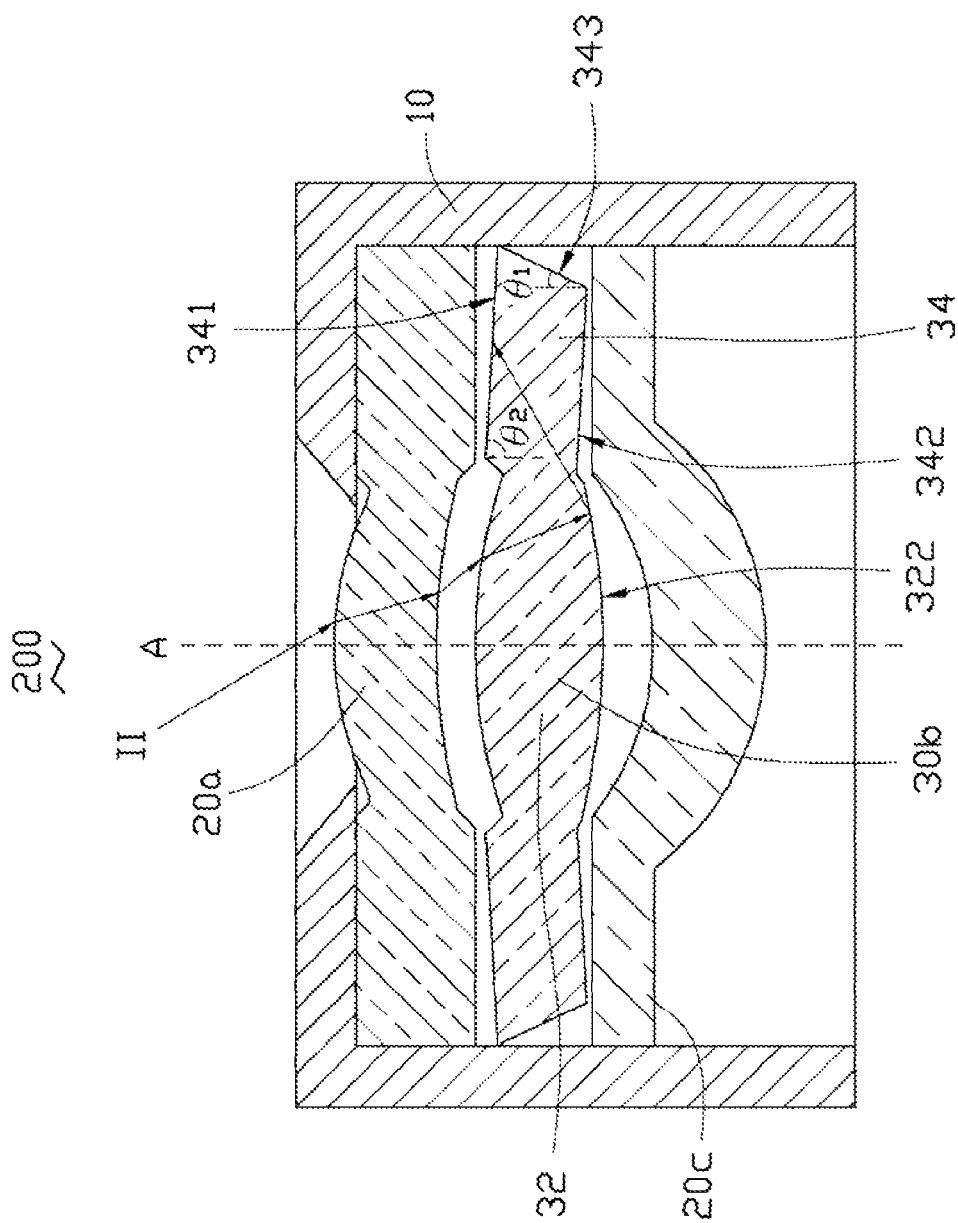
FIG. 2 is a schematic, cross-sectional view of a camera module according to a second embodiment of the present disclosure.

FIG. 2 shows a second embodiment of a camera module 200. The camera module 200 differs from the camera module 100 of the first embodiment only in a second lens 30b thereof. In this embodiment, the second lens 30b has beveled surfaces formed at all the outside surfaces of a fixing portion 34 thereof. That is, an object-side surface 341, an image-side surface 342 and a lateral-side surface 343 of the fixing portion 34 of the second lens 30b all are beveled relative to the optical axis A of the camera module 200. The object-side surface 341 is parallel to the image-side surface 342. An inner periphery of the object-side surface 341 connected to an optical portion 32 of the second lens 30b is higher than an outer periphery of the object-side surface 341 adjacent to the lens barrel 10. An inner periphery of the image-side surface 342 connected to the optical portion 32 of the second lens 30b is higher than an outer periphery of the image-side surface 342 adjacent to the lens barrel 10. An angle between the object-side surface 341 and the lateral-side surface 343 is smaller than 90°, and an angle between the image-side surface 342 and the lateral-side surface 343 is larger than 90°. An angle θ1 is defined between the lateral-side surface 343 and the optical axis A. An angle θ2 is defined between the optical axis A and each of the object-side surface 341 and the image-side surface 342. The angle θ1 is smaller than the angle θ2.

As shown by path II in FIG. 2, light is incident on an emitting surface 322 of the optical portion 32 of the second lens 30b, and a portion of the light is reflected by the emitting surface 322 to the object-side surface 341 of the fixing portion 34 of the second lens 30b. Since the object-side surface 341 of the fixing portion 34 of the second lens 30b is beveled, incident angles of the light which reaches the object-side surface 341 are reduced compared to the case where the object-side surface were horizontal. Therefore, total internal reflection at the object-side surface 341 of the second lens 30b is reduced. Typically, a majority of the light incident on the object-side surface 341 can directly exit the second lens 30b through the object-side surface 341.

In addition, a remaining portion of the light incident on the object-side surface 341 is reflected to the image-side surface 342 and/or the lateral-side surface 343 of the fixing portion 34 of the second lens 30b. The beveled image-side surface 342 and the beveled lateral-side surface 343 each reduce the incident angle of the light incident thereon, and so most or even all of the reflected light can exit the second lens 30b through the image-side surface 342 and/or the lateral-side surface 343. Therefore, the portion of the light reflected by the emitting surface 322 can exit to an exterior of the second lens 30b through the lateral-side surface 343, the object-side surface 341 and the image-side surface 342. Accordingly, astigmatic light associated with the peripheral portion of the second lens 30b is avoided, and the image quality of the camera module 200 can be improved.

Figure 3:
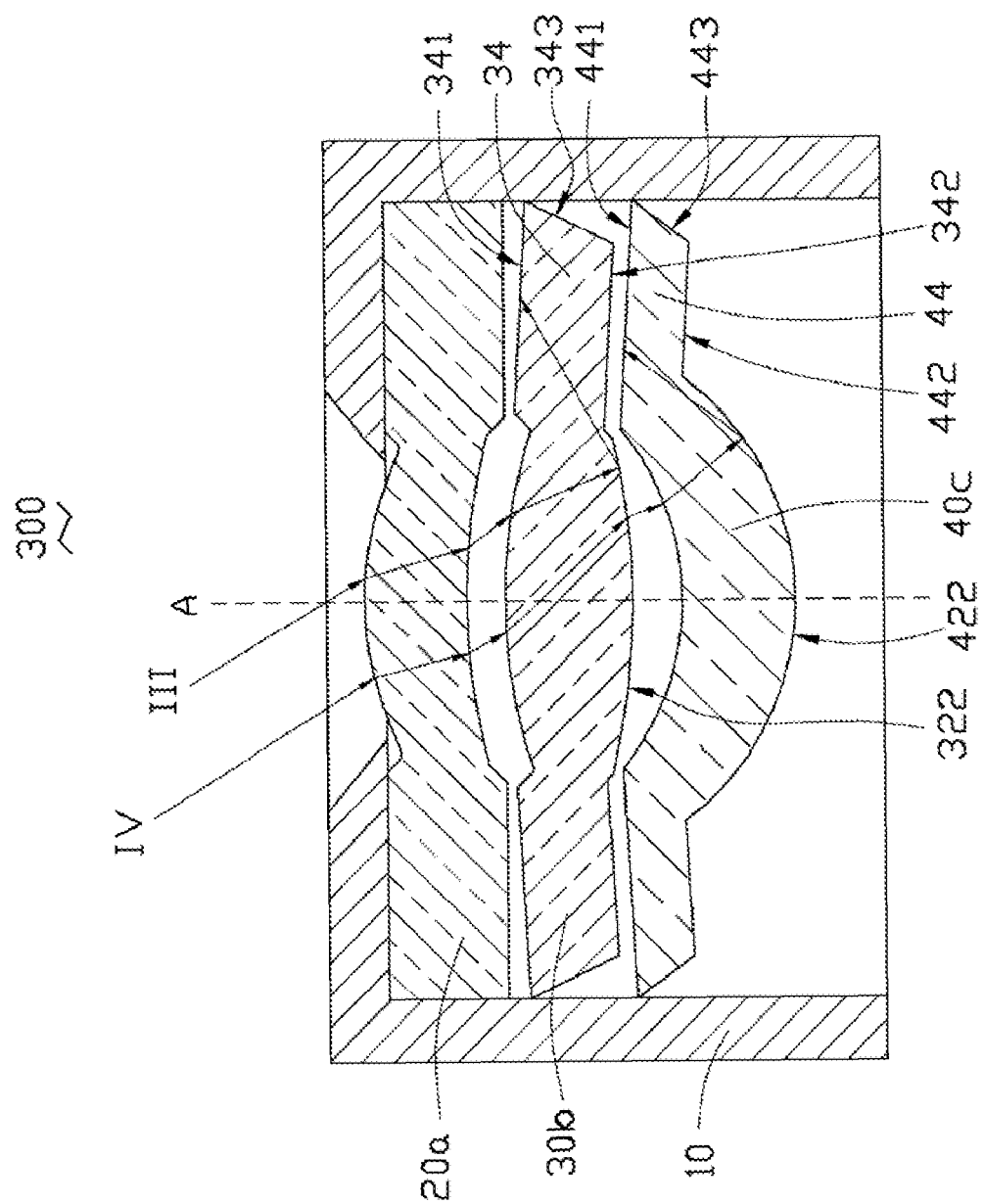
FIG. 3 is a schematic, cross-sectional view of a camera module according to a third embodiment of the present disclosure.
Figure 4:
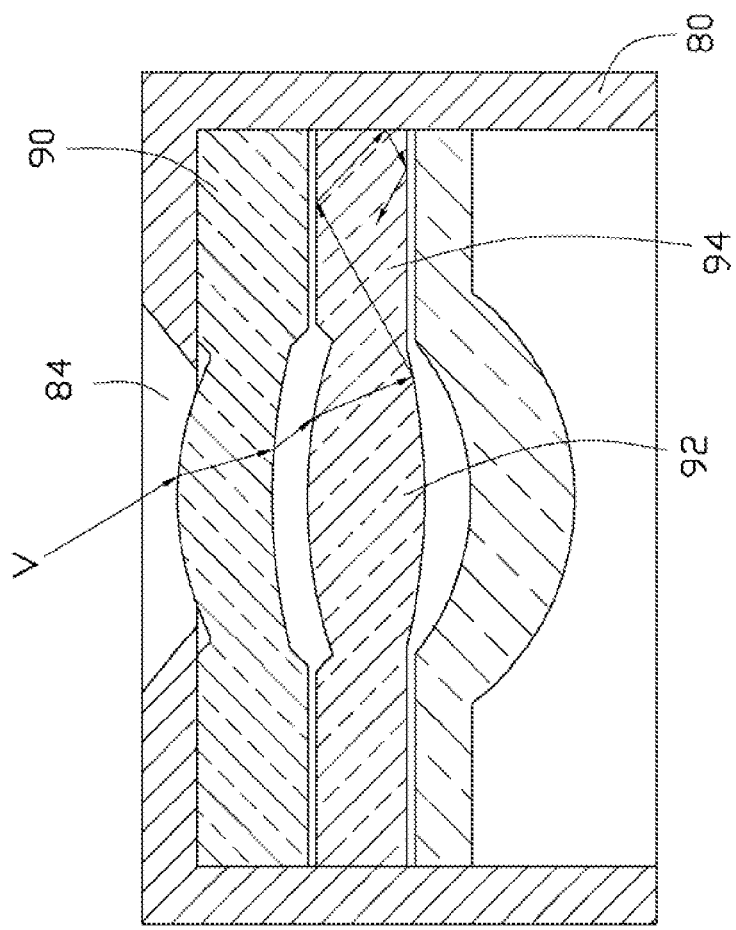
FIG. 4 is a schematic, cross-sectional view of a commonly used camera module.

FIG. 3 shows a third embodiment of a camera module 300. In this embodiment, not only a second lens 30b of the camera module 300 has beveled surfaces formed at all the outside surfaces of a fixing portion 34 thereof, but also a third lens 40c of the camera module 300 has beveled surfaces formed at all the outside surfaces of a fixing portion 44 thereof. That is, an object-side surface 341, an image-side surface 342 and a lateral-side surface 343 of the fixing portion 34 of the second lens 30b, and an object-side surface 441, an image-side surface 442 and a lateral-side surface 443 of the fixing portion 44 of the third lens 40c, are all beveled relative to the optical axis A of the camera module 300. The object-side surface 341 and the image-side surfaces 342 of the second lens 30b are substantially parallel to each other, and the object-side surface 441 and the image-side surface 442 of the third lens 40c are substantially parallel to each other. In the illustrated embodiment, the lateral-side surfaces 343, 443 of the second and third lenses 30b, 40c are nonparallel relative to each other. In particular, an angle between the lateral-side surface 343 and the optical axis A is less than an angle between the lateral-side surface 443 and the optical axis A. In other embodiments, the lateral-side surfaces 343, 443 can be substantially parallel to each other.

As shown by path III in FIG. 3, the light reflected to the fixing portion 34 of the second lens 30b by an emitting surface 322 of the second lens 30b can exit through any one of the image-side surface 342, the object-side surface 341 and the lateral-side surface 343 of the fixing portion 34 of the second lens 30b to an outside of the second lens 30b. As shown by path IV in FIG. 3, the light reflected to the fixing portion 44 of the third lens 40c by an emitting surface 422 of the third lens 40c can exit through any one of the image-side surface 442, the object-side surface 441 and the lateral-side surface 443 of the fixing portion 44 of the third lens 40c to an outside of the third lens 40c. Accordingly, total internal reflection at outer peripheries of the fixing portions 34, 44 of the second and third lenses 30b, 40c is avoided, and most or even all of the light in the fixing portions 34, 44 can exit the lenses 30b, 40c. Accordingly, astigmatic light associated with the peripheral portions of the second and third lenses 30b, 40c is avoided, and the image quality of the camera module 300 can be improved.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera module, comprising:
   a lens barrel defining an aperture for light to enter the lens barrel; and
   a lens received in the lens barrel, the lens comprising a central optical portion aligned with the aperture of the lens barrel and a fixing portion around a periphery of the optical portion for fixing the lens in the lens barrel;
   wherein an outside surface of the fixing portion comprises an object-side surface, an image-side surface, and a lateral-side surface interconnecting the image-side surface and the object-side surface;
   wherein the lateral-side surface has a circular frustoconical shape with a diameter decreasing gradually from where the lateral-side surface connects with the object-side surface to where the lateral-side surface connects with the image-side surface, whereby the entire lateral-side surface is beveled relative to an optical axis of the camera module to be able to reduce or avoid total internal reflection of the light at the lateral-side surface; and
   wherein the image-side surface and the object-side surface of the fixing portion of the lens are parallel to each other, and are beveled relative to the optical axis of the camera module.

2. The camera module of claim 1, wherein an angle between the lateral-side surface of the fixing portion of the lens and the optical axis of the camera module is in the range from about 1° to about 89°.

3. The camera module of claim 1, wherein the image-side surface and the object-side surface of the fixing portion of the lens are parallel to each other, and are substantially perpendicular to the optical axis of the camera module.

4. The camera module of claim 1, wherein an angle between the object-side surface and the optical axis of the camera module is larger than an angle between the lateral-side surface and the optical axis of the camera module.

5. The camera module of claim 4, wherein an internal included angle of the fixing portion between the object-side surface and the lateral-side surface is less than an internal included angle of the fixing portion between the image-side surface and the lateral-side surface.

6. The camera module of claim 5, wherein the optical portion of the lens comprises an incident surface facing the aperture and an emitting surface, the object-side surface extending radially outwardly from the incident surface, the image-side surface extending radially outwardly from the emitting surface, the lateral-side surface facing an inner wall of the lens barrel.

7. The camera module of claim 1, further comprising two other lenses received in the lens barrel and sandwiching the lens therebetween, with all the lenses aligned with the optical axis of the camera module, each of the other two lenses comprising a central optical portion aligned with the aperture of the lens barrel and a fixing portion around the optical portion, an outer surface of the fixing portion of one of the two other lenses farthest away from the aperture of the lens barrel being beveled relative to an optical axis of the camera module.

8. The camera module of claim 1, wherein the lens barrel comprises a black inner surface surrounding and facing the lens.

9. A camera module, comprising:
   a lens unit comprising a plurality of lenses arranged along an optical axis of the camera module, each of the lenses comprising a central optical portion and a fixing portion around the optical portion; and
   a lens barrel receiving the lens unit therein, the lens barrel defining an aperture at a central portion of one end thereof for light to enter the lens barrel, the aperture aligned with the optical portions of the lenses;
   wherein an outer surface of the fixing portion of each lens comprises an object-side surface, an image-side surface, and a lateral-side surface interconnecting the image-side surface and the object-side surface;
   wherein a diameter of the lateral-side surface of at least one of the fixing portions decreases gradually along a direction away from where the lateral-side surface connects with the object-side surface, whereby the entire lateral-side surface of the at least one of the fixing portions is slanted relative to the optical axis of the camera module to be able to reduce or avoid total internal reflection of the light at the lateral-side surface of the at least one of the fixing portions; and
   wherein the object-side surface, the image-side surface and the lateral-side surface of the at least one of the fixing portions are all obliquely angled surfaces with respect to the optical axis of the camera module.

10. The camera module of claim 9, wherein the optical portion of each lens comprises an incident surface and an emitting surface at two opposite sides thereof, the object-side surface of each fixing portion extending outwardly from the incident surface of the corresponding optical portion, and the image-side surface of each fixing portion extending outwardly from the emitting surface of the corresponding optical portion.

11. The camera module of claim 10, wherein the lateral-side surfaces of two of the fixing portions farthest away from the aperture are angled surfaces.

12. The camera module of claim 10, wherein the lateral-side surfaces, the object-side surfaces and the image-side surfaces of two of the fixing portions farthest away from the aperture are all obliquely angled surfaces with respect to the optical axis of the camera module.

13. The camera module of claim 10, wherein the lens barrel comprises a black inner surface surrounding and facing the lateral-side surface of the at least one of the fixing portions.

14. The camera module of claim 9, wherein an angle between the optical axis of the camera module and the lateral-side surface of the at least one of the fixing portions is in the range from about 1° to about 89°.

15. The camera module of claim 9, wherein the object-side surface and the image-side surface of the at least one of the fixing portions are parallel to each other, and an angle between the object-side surface of the at least one of the fixing portions and the optical axis of the camera module is greater than an angle between the lateral-side surface of the at least one of the fixing portions and the optical axis of the camera module.

16. A camera module, comprising:
   a lens barrel defining an aperture for light to enter the lens barrel;
   a lens received in the lens barrel, the lens comprising a central optical portion aligned with the aperture of the lens barrel and a fixing portion around a periphery of the optical portion for fixing the lens in the lens barrel; and
   two other lenses received in the lens barrel and sandwiching the lens therebetween;
   wherein an outside surface of the fixing portion comprises an object-side surface, an image-side surface, and a lateral-side surface interconnecting the image-side surface and the object-side surface;
   wherein the lateral-side surface has a circular frustoconical shape with a diameter decreasing gradually from where the lateral-side surface connects with the object-side surface to where the lateral-side surface connects with the image-side surface, whereby the entire lateral-side surface is beveled relative to an optical axis of the camera module to be able to reduce or avoid total internal reflection of the light at the lateral-side surface; and
   wherein with all the lenses aligned with the optical axis of the camera module, each of the other two lenses comprises a central optical portion aligned with the aperture of the lens barrel and a fixing portion around the optical portion, an outer surface of the fixing portion of one of the two other lenses farthest away from the aperture of the lens barrel being beveled relative to an optical axis of the camera module.

* * * * *